US012158168B1

(12) United States Patent
Kozlowski

(10) Patent No.: US 12,158,168 B1
(45) Date of Patent: Dec. 3, 2024

(54) VENTURI-STYLE VACUUM-BOOSTING HOSE ATTACHMENT AND ASSOCIATED METHOD(S)

(71) Applicant: Daniel Kozlowski, Jacksonville, FL (US)

(72) Inventor: Daniel Kozlowski, Jacksonville, FL (US)

( * ) Notice: Subject to any disclaimer, the term of this patent is extended or adjusted under 35 U.S.C. 154(b) by 24 days.

(21) Appl. No.: 18/352,746

(22) Filed: Jul. 14, 2023

Related U.S. Application Data

(60) Provisional application No. 63/368,591, filed on Jul. 15, 2022.

(51) Int. Cl.
*F15D 1/02* (2006.01)
*A47L 9/24* (2006.01)
*F04F 5/16* (2006.01)

(52) U.S. Cl.
CPC .............. *F15D 1/025* (2013.01); *A47L 9/248* (2013.01); *F04F 5/16* (2013.01)

(58) Field of Classification Search
CPC ............. F15D 1/025; A47L 9/248; F04F 5/16
See application file for complete search history.

(56) References Cited

U.S. PATENT DOCUMENTS 10,619,656 B1 * 4/2020 Handley ................. F23K 5/002
11,130,100 B1 * 9/2021 Berg ................. B01F 25/31243
2013/0125527 A1 * 5/2013 Clark ................... G05D 7/0186
60/770
2019/0192884 A1 * 6/2019 Cowhig .................. B63C 11/18
2023/0400044 A1 * 12/2023 Havard, Jr. ............. F24F 13/08

* cited by examiner

*Primary Examiner* — Kevin R Barss
(74) *Attorney, Agent, or Firm* — Ashkan Najafi

(57) ABSTRACT

A venturi-style vacuum-boosting hose attachment includes a single and unitary body having a centrally registered longitudinal axis, a primary inlet located at a proximal end of the body and having a first venturi passageway, a secondary bell-mouth inlet contiguous with the primary centrally disposed inlet and having a second venturi passageway, and a tail cone contiguous with the secondary inlet and having a third passageway terminating at an outlet located at a distal end of the body. The secondary inlet is configured to feed smooth air through the throat to the tail cone with increased velocity and egress via the outlet. The first venturi passageway, the second venturi passageway, and the tail cone are configured to modify a high-volume, low vacuum airflow source into a low-volume, high-vacuum airflow upstream of the primary inlet.

20 Claims, 8 Drawing Sheets

VENTURI-STYLE VACUUM-BOOSTING HOSE ATTACHMENT AND ASSOCIATED METHOD(S)

CROSS REFERENCE TO RELATED APPLICATIONS

This is a non-provisional patent application that claims priority to and benefit of U.S. provisional patent application No. 63/368,591 filed Jul. 15, 2022, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to vacuum hose attachment and, more particularly, to a specially configured venturi-style vacuum-boosting hose attachment that is connected to a conventional dust collector/cyclone dust collector system having a reduced-diameter intake hose, wherein the venturi-style vacuum-boosting hose attachment increases velocity, air flow, and suction by decreasing the pressure and increasing the velocity via the venturi effect while also increasing air flow and velocity within the attached ducting by means of a secondary inlet.

Prior Art

Dust collectors are high-volume low-vacuum devices that are commonly used in production and home workshops to capture dust and other debris from larger dust producing equipment. They keep shops clean, while also providing clean breathable air. Many different types of dust collectors are available for use. In smaller production and home workshops, 1.5-3 hp single stage dust collectors or 1.5-7 hp two-stage cyclone dust collectors are used to capture dust and provide good filtering with HEPA filters down to 0.3 Micron. Dust collectors provide higher air flow, have large dust containers, and they separate dust efficiently and effectively without clogging.

Shop vacuums work differently and are low volume high-vacuum devices that can be attached directly to smaller tools to take in the dust created while using the tool. But they have issues for example, in the case of wood working machines, dust is created so quickly it clogs the filter causing the shop vacuum to lose suction and become ineffective. Bags are available to provide a first level of separation for the dust and other debris. Shop vacuums produce low air flow and are not suitable for larger dust producing machines limiting their use with in the wood workshop.

Smaller cyclone dust separators can be purchased and fitted to the top of a five-gallon bucket. Cyclone dust separators use the centrifugal forces of rotating air to throw the dust and debris to the outside walls of the separator where gravity then allows the dust and debris to fall into the collection vessel. These smaller cyclones are connected in line with the tool and the shop vacuum for dust separation, but they further reduce the cubic feet/minute (CFM) of the smaller diameter hoses lowering their effectiveness on large dust producing tools.

Wood workers currently need two dust collection devices: a small shop vacuum/extractor for small tools and a large dust collector for large tools for proper dust collection.

While trying to get the benefits of the larger dust collectors and cyclone systems, wood workers try to connect a smaller diameter vacuum hose (e.g., 1.5-inch) to a large dust collection system, and until now it simply did not work. The duct velocity drops to under 1000 feet per/minute (FPM)/100 CFM, with this setup, and at that flowrate the large dust collector and cyclone becomes ineffective and there is no longer dust separation within the cyclone due to the low air flow rate, and there is also no increase in suction. The reduced air flow rate also causes debris and dust to fall out of the air stream and clog the ducting system.

Accordingly, a need remains for venturi-style vacuum-boosting hose attachment in order to overcome at least one of the above-noted shortcomings. The exemplary embodiment(s) satisfy such a need by a specially configured venturi-style vacuum-boosting hose attachment connected to a conventional dust collector/cyclone dust collector system/having a reduced-diameter intake hose, that is convenient and easy to use, non-clogging, lightweight yet durable in design, versatile in its applications, and configured to increase velocity, air flow, and suction by decreasing pressure and increasing velocity via the venturi effect. The present disclosure eliminates the need for the smaller shop vacuum/extractor in a wood shop environment making it easier with only one dust collection device that filters and separates dust effectively and efficiently.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially configured venturi-style vacuum-boosting hose attachment that is connected to a conventional dust collector/cyclone dust collector system having a reduced-diameter intake hose, wherein the venturi-style vacuum-boosting hose attachment increases velocity, air flow, and suction by decreasing the pressure and increasing the velocity via the venturi effect while also increasing air flow and velocity within the attached ducting by means of a secondary inlet. These and other objects, features, and advantages of the non-limiting exemplary embodiment(s) are provided by a venturi-style vacuum-boosting hose attachment including a single and unitary body having a centrally registered longitudinal axis. Such a body includes a primary inlet located at a proximal end of the body and having first venturi passageway, a secondary bell-mouth inlet contiguous with the primary centrally disposed inlet and having a second venturi passageway, and a tail cone contiguous with the secondary inlet and having a third passageway terminating at an outlet located at a distal end of the body. Advantageously, the secondary inlet is configured to feed smooth air through the throat to the tail cone with increased velocity and egress via the outlet. Advantageously, the first venturi passageway, the second venturi passageway, and the tail cone are configured to modify a high-volume, low vacuum airflow source into a low-volume, high-vacuum airflow upstream of the primary inlet. Advantageously, the first venturi passageway, the second venturi passageway, and the tail cone are configured to enable the use of smaller hoses and smaller existing dust ported tools on larger existing dust separators and existing cyclone dust collection systems. Such a structural configuration yields the new, useful, and unexpected result of improving air flow and suction while increasing ducting velocity.

In a non-limiting exemplary embodiment, the primary inlet has a primary opening centrally circumscribed about the centrally registered longitudinal axis. Such a structural configuration yields the new, useful, and unexpected result of improving air flow and suction while increasing ducting velocity.

In a non-limiting exemplary embodiment, the primary opening has an inner diameter converging distally towards the second inlet. Such a structural configuration yields the new, useful, and unexpected result of improving air flow and suction while increasing ducting velocity.

In a non-limiting exemplary embodiment, the first venturi passageway begins at the proximal end of the body and terminates at a beginning of the second venturi passageway. Such a structural configuration yields the new, useful, and unexpected result of improving air flow and suction while increasing ducting velocity.

In a non-limiting exemplary embodiment, the first venturi passageway and the second venturi passageway are coaxially aligned and contiguously disposed at an end-to-end configuration along the centrally registered longitudinal axis. The throat is downstream of the first venturi passageway and the second venturi passageway. Such a structural configuration yields the new, useful, and unexpected result of improving air flow and suction while increasing ducting velocity.

In a non-limiting exemplary embodiment, an initial diameter of a proximal end of the first venturi passageway is greater than an ending diameter of a distal end of the first venturi passageway. Such a structural configuration yields the new, useful, and unexpected result of improving air flow and suction while increasing ducting velocity.

In a non-limiting exemplary embodiment, the secondary inlet has a bell-mouth shape and is located downstream of the primary inlet. Such a structural configuration yields the new, useful, and unexpected result of improving air flow and suction while increasing ducting velocity.

In a non-limiting exemplary embodiment, a diameter of a proximal end of the second venturi passageway is greater than a diameter of a distal end of the second venturi passageway. Such a structural configuration yields the new, useful, and unexpected result of improving air flow and suction while increasing ducting velocity.

In a non-limiting exemplary embodiment, the diameter of the distal end of the second venturi passageway is integral with a proximal end of the tail cone. Such a structural configuration yields the new, useful, and unexpected result of improving air flow and suction while increasing ducting velocity.

In a non-limiting exemplary embodiment, a diameter of the proximal end of the tail cone is less than a diameter of the outlet. Such a structural configuration yields the new, useful, and unexpected result of improving air flow and suction while increasing ducting velocity.

In a non-limiting exemplary embodiment, an entire longitudinal length of the body spans from the primary inlet to the outlet. Such a structural configuration yields the new, useful, and unexpected result of improving air flow and suction while increasing ducting velocity.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
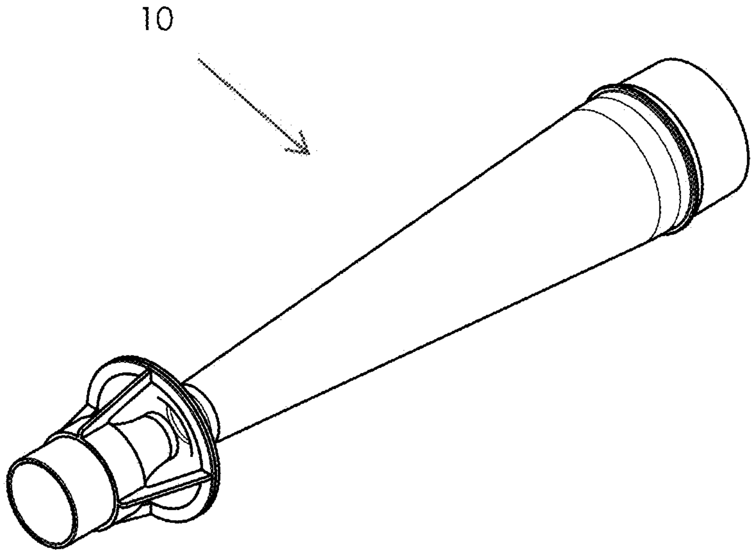
FIG. 1 is a perspective view of a specially configured venturi-style vacuum-boosting hose attachment, in accordance with a non-limiting exemplary embodiment of the present disclosure.
Figure 2:
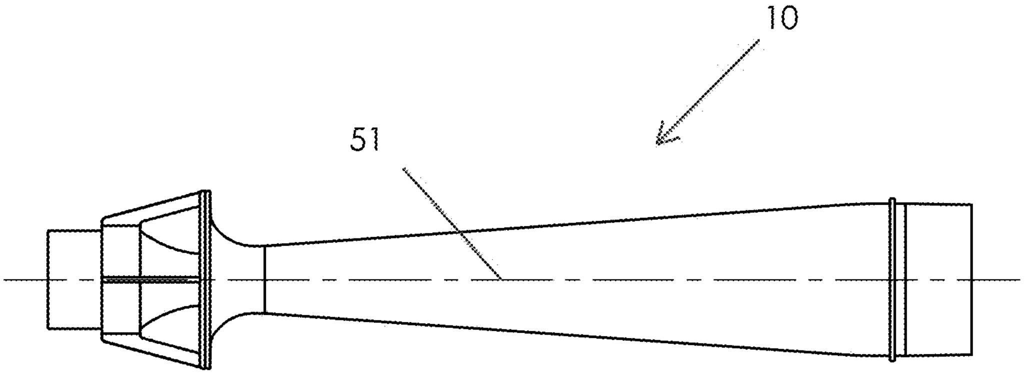
FIG. 2 is a side elevational view of the specially configured venturi-style vacuum-boosting hose attachment, in accordance with a non-limiting exemplary embodiment of the present disclosure.
Figure 3:
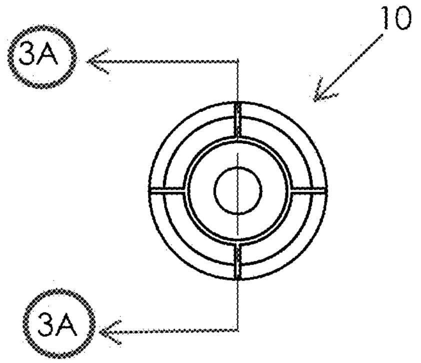
FIG. 3 is a front elevational view of the specially configured venturi-style vacuum-boosting hose attachment, in accordance with a non-limiting exemplary embodiment of the present disclosure.
Figure 3A:
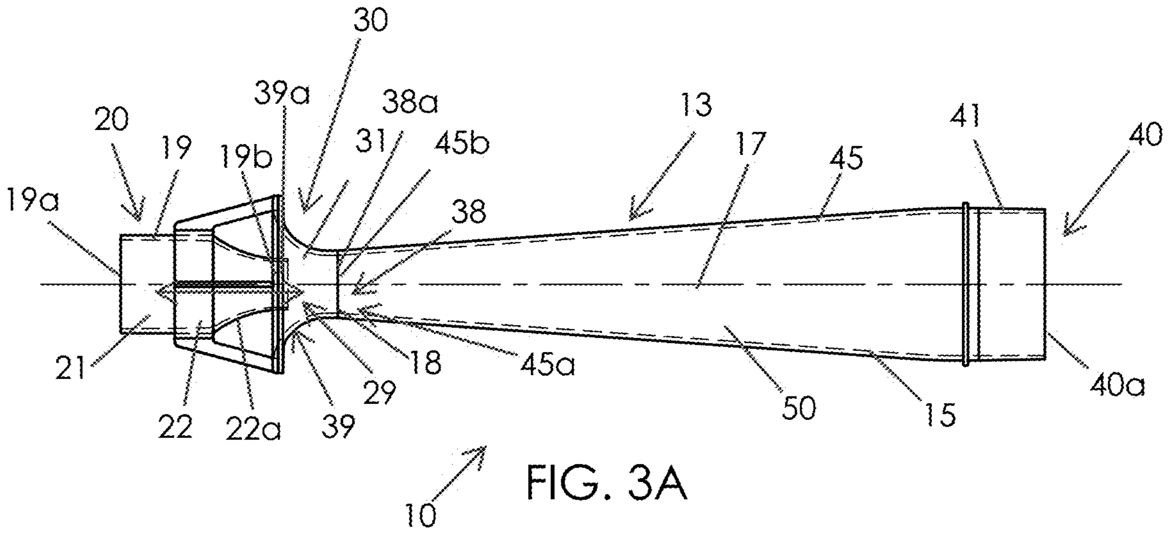
FIG. 3A is a cross-sectional view taken along line 3A-3A in FIG. 3, in accordance with a non-limiting exemplary embodiment of the present disclosure.
Figure 4:
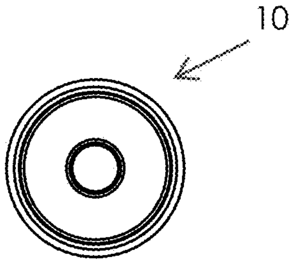
FIG. 4 is a rear elevational view of the specially configured venturi-style vacuum-boosting hose attachment, in accordance with a non-limiting exemplary embodiment of the present disclosure.
Figure 5:
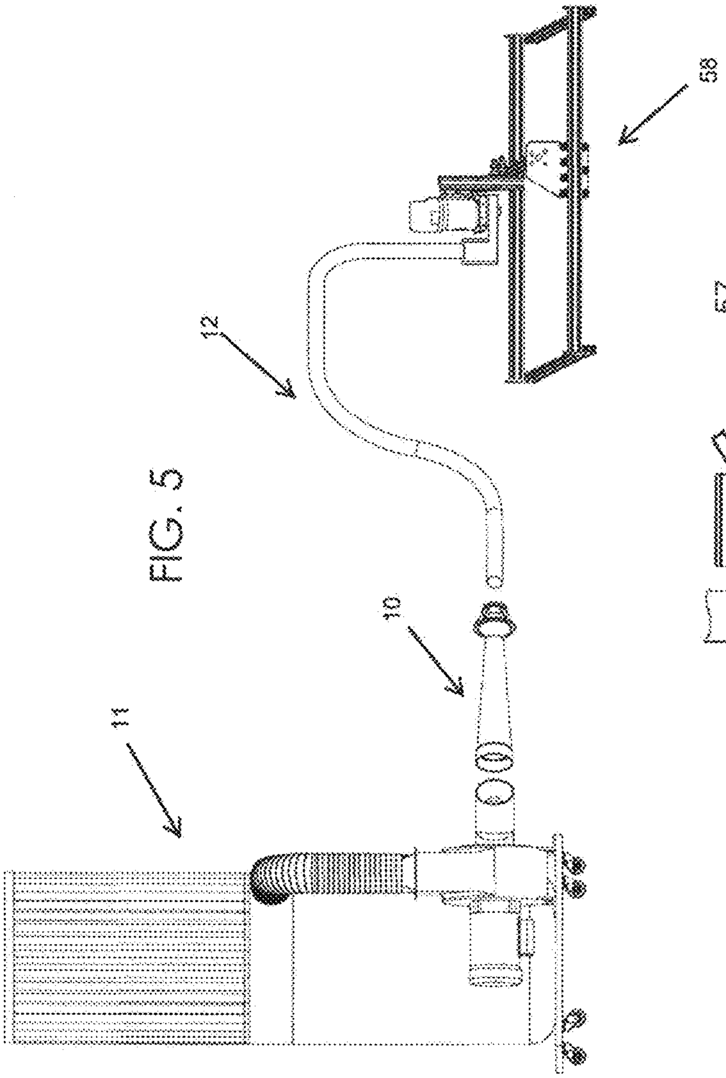
FIG. 5 is a perspective view showing the specially configured venturi-style vacuum-boosting hose attachment employed in a non-limiting exemplary environment, in accordance with a non-limiting exemplary embodiment of the present disclosure.
Figure 5A:
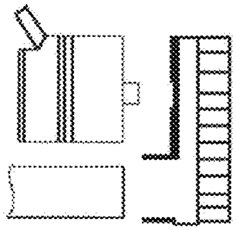
FIG. 5A is an exploded view of a dust boot shown in FIG. 5, in accordance with a non-limiting exemplary embodiment of the present disclosure.
Figure 6:
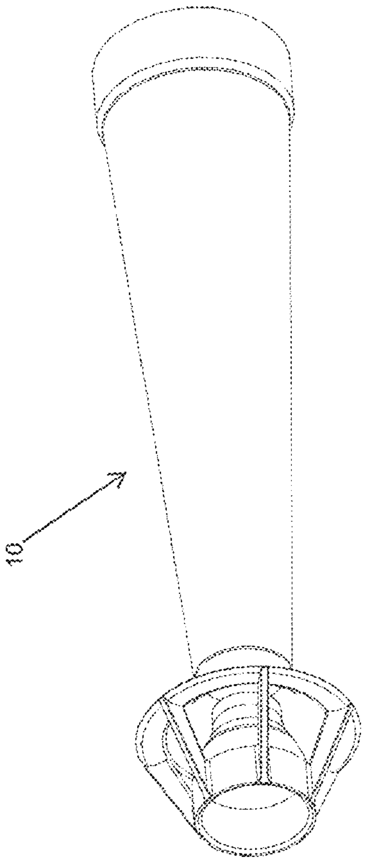
FIG. 6 is a perspective view of another specially configured venturi-style vacuum-boosting hose attachment, in accordance with a non-limiting exemplary embodiment of the present disclosure.
Figure 7:
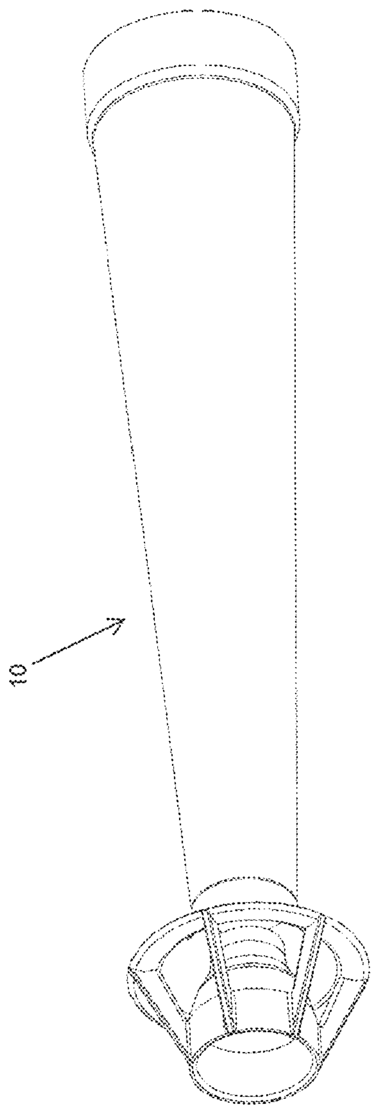
FIG. 7 is a perspective view of yet another specially configured venturi-style vacuum-boosting hose attachment, in accordance with a non-limiting exemplary embodiment of the present disclosure.
Figure 8:
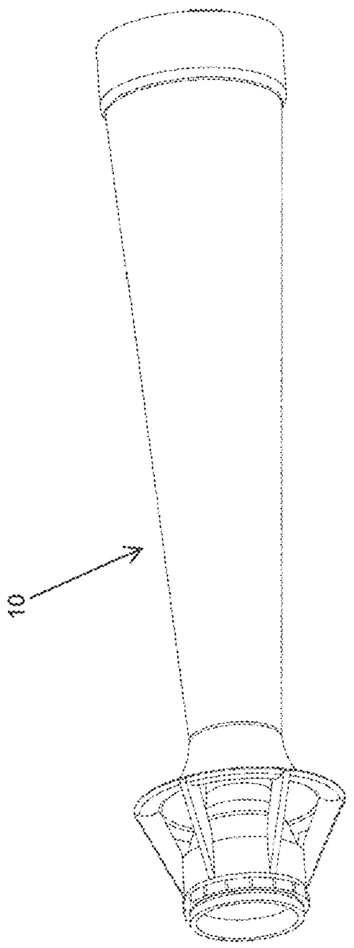
FIG. 8 is a perspective view of yet another specially configured venturi-style vacuum-boosting hose attachment, in accordance with a non-limiting exemplary embodiment of the present disclosure.
Figure 9:
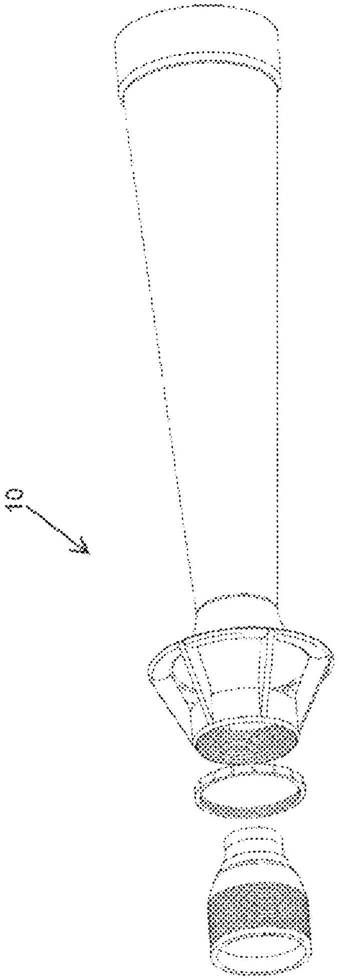
Figure 10:
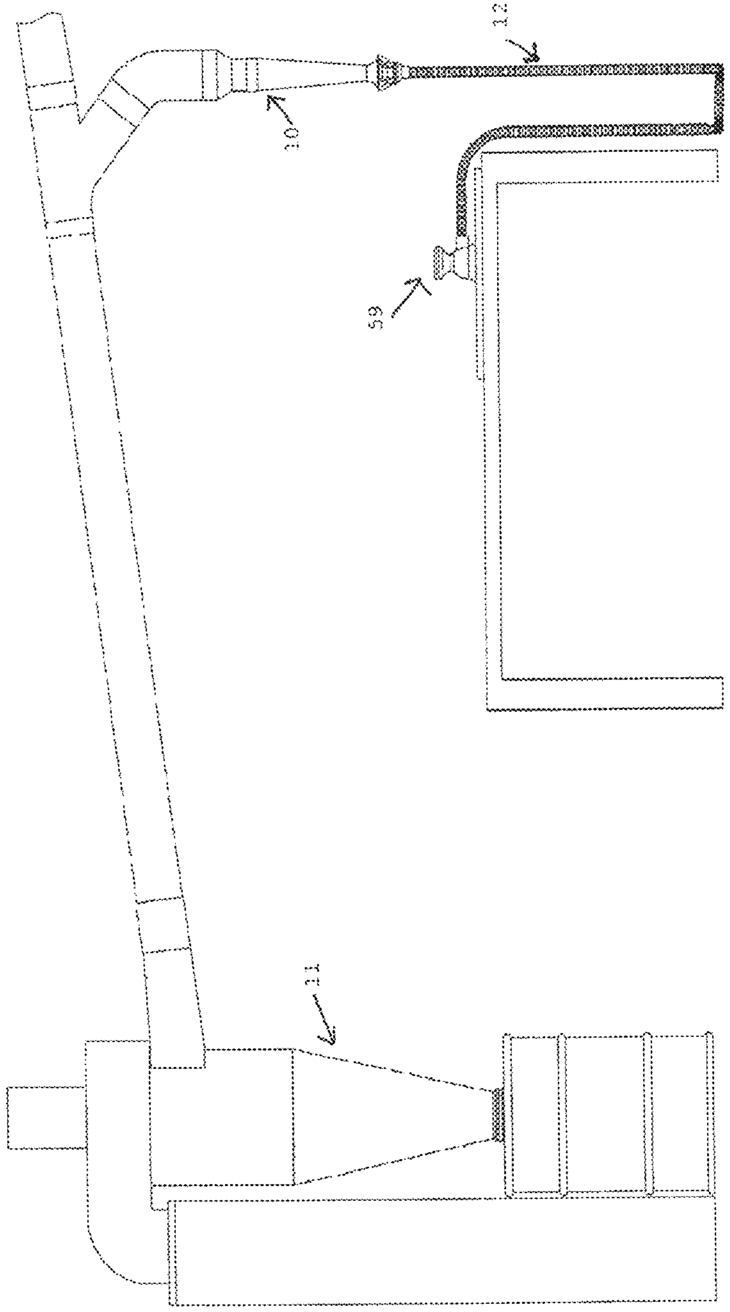

FIG. 9 is a perspective view of another specially configured venturi-style vacuum-boosting hose attachment, in accordance with a non-limiting exemplary embodiment of the present disclosure; and FIG. 10 is a perspective view showing the specially configured venturi-style vacuum-boosting hose attachment employed in a non-limiting exemplary environment, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means ±15% of the numerical.

If used herein, "substantially" means largely if not wholly that which is specified but so close that the difference is insignificant.

The non-limiting exemplary embodiment(s) is/are referred to generally in FIGS. 1-10 and is/are intended to provide a specially configured venturi-style vacuum-boosting hose attachment 10 connected to a conventional dust collector/cyclone dust collection system 11 having a reduced-diameter intake hose 12, wherein the venturi-style vacuum-boosting hose attachment 10 increases velocity, air flow, and suction by decreasing pressure and increasing velocity via the venturi effect, while also increasing air flow and velocity within the attached ducting by means of a secondary inlet 30. It should be understood that the exemplary embodiment(s) may be retrofitted onto a variety of dust collectors, cyclone dust collector, etc., and should not be limited to any particular variety of dust collectors, etc. described herein. Thus, various embodiments of the present disclosure are compatible with both dust collectors (e.g., for use with larger, stationary machines such as a table saw and a planer, for example) and smaller, portable power tools).

Referring to FIGS. 1-10 in general, in a non-limiting exemplary embodiment(s), the present disclosure relates generally to increasing the effectiveness of dust separation and collection systems 11 while enabling the use of smaller hoses 12 and smaller dust ported tools on larger dust separators and collection systems 11. Specifically, the present disclosure improves the suction, velocity, and airflow of dust separation and collection systems 11 and is suitable for use in many applications.

The venturi-style, vacuum-boosting hose attachment 10 yields the new, useful, and unpredictable result of boosting the vacuum of a gas/liquid source already under vacuum. It is not powered by compressed air or any other power source. Rather, it uses the gas/liquid source under vacuum and the venturi effect to increase the pressure differential which pulls in more gas/liquid at a higher velocity into a primary inlet 20 while also pulling into a secondary inlet 30. Advantageously, the venturi configuration is not standard because it is used in reverse of a normal venturi tube injector or eductor. The present disclosure provides a new venturi structure including a venturi vacuum booster that converts a high-flow, low-vacuum source into a low-flow, high-vacuum source.

There are many uses for this new venturi structure. For example, it can be employed in dust collection systems 11 to boost the velocity, airflow, and suction of smaller vacuum hoses 12 when connected to a dust collection system 11.

In a non-limiting exemplary embodiment, the hose attachment 10 can be retrofitted to various sizes and fit commercial and other home applications and not just for wood working. The throat diameter 18 and length affect both airflow and suction. The tail cone 45 angle also affects maximum vacuum. A smaller throat diameter 18 decreases airflow but increases suction.

In a non-limiting exemplary embodiment, an adjustable primary intake portion (passageway) can move in or out changing the distance of the primary inlet 20 from the throat 18 to enable vacuum adjustment.

In a non-limiting exemplary embodiment, the hose attachment 10 can be used for dust collection, boosting hot tub filtration, pool filtration/skimmer suction booster, vacuum hold down, vacuum lifting devices, aerospace applications, automotive applications, HVAC return systems, vacuum cleaners, aquarium filtration, etc.

In a non-limiting exemplary embodiment, the hose attachment 10 includes a venturi tube 13 having two inlets 20, 30 and one outlet 40. A primary central inlet 20 functions as a first venturi passageway 21 and fits a universal shop vacuum fitting of 2.25 inch. A secondary (intermediate) bell-mouth inlet 30 functions as a second venturi passageway 31 and feeds smooth air through the throat 18 to the tail cone 45 with increased velocity. The outlet 40 is located at a distal end 41 of the body 15 (e.g., long tail cone 45 end). Such an outlet 40 connects directly to a 4-inch dust collection fitting. Such a structural configuration of the body 15 increases suction, velocity, and airflow of the reduced diameter hose 12 attached to the primary central inlet 20 and allows a user to employ smaller dust ported tools on larger dust separation and collection systems 11.

In a non-limiting exemplary embodiment, the venturi-style, vacuum-boosting hose attachment 10 increases the airflow and velocity to the attached dust collector or ducting system 11 by way of the secondary (intermediate) inlet 30, which allows proper airflow to prevent chips and dust from building up in the duct. The secondary (intermediate) inlet 30 also allows in an increased airflow when the primary (initial) inlet 20 is fully blocked off, thereby producing maximum sealed suction. This increased airflow ensures proper operation of cyclone dust separators and dust collection systems 11.

In a non-limiting exemplary embodiment, the primary (initial) inlet 20 tapers inwardly towards a centrally registered longitudinal axis 17 from a standard shop vacuum fitting of 2.25-inch to a smaller diameter (e.g., 1 to 1.25 inches) to increase velocity and allow more airflow into the secondary bell-mouth (intermediate) inlet 30. The bell-mouth intake 30 (secondary inlet) preferably has an inwardly flanged lip (about a 1 to 2 inch radius) converging towards the centrally registered longitudinal axis 17, which allows for smooth and even entry of air at higher velocities into the venturi throat 18 and thereby increases the differential pressure.

In a non-limiting exemplary embodiment, the throat 18 is 1 to 2 inches in diameter and has a length of 0-1 diameter. The tail cone 45 has a shallow angle of about 4-6 degrees diverging away from the centrally registered longitudinal axis 17, and promotes maximum airflow recovery and increase differential pressure. The outlet 40 at the distal end 41 of the tail cone 45, of the 4-inch embodiment, fits a standard 4-inch dust collector fitting. Of course, embodiments of the present disclosure may be retrofitted to connect to a variety of adapters (e.g., Nordfab metal ducting, flange adapters for other popular ducting types, standard size SDR PVC reducers, etc.)

In a non-limiting exemplary embodiment, the venturi-style, vacuum-boosting hose attachment 10 converts the excess airflow of larger dust collector/cyclone separators from a high-volume, low-vacuum airflow to a low-volume, high-vacuum airflow. This allows the employed of smaller dust ported hoses 12 and tools, on the large dust collectors (e.g., router tables, track saws, dust boots 57, pocket hole fixtures, CNC router tables 58, hand sanders 59 etc.).

In a non-limiting exemplary embodiment, larger and smaller models of the venturi-style, vacuum-boosting hose attachment 10 include a 6-inch to 4-inch model that can boost airflow through a smaller 4-inch port and increase suction and velocity Referring to FIGS. 1-10 in general, the venturi-style vacuum-boosting hose attachment 10 including a single and unitary body 15 having a centrally registered longitudinal axis 17. Such a body 15 includes a primary inlet 20 located at a proximal end 19 of the body 15 and having first venturi passageway 21, a secondary bell-mouth inlet 30 contiguous with the primary centrally disposed inlet 20 and having a second venturi passageway 31, and a tail cone 45 contiguous with the secondary inlet 30 and having a third passageway 50 terminating at an outlet 40 located at a distal end 41 of the body 15. Advantageously, the secondary inlet 30 is configured to feed smooth air through the throat 18 to the tail cone 45 with increased velocity and egress via the outlet 40. Advantageously, the first venturi passageway 21, the second venturi passageway 31, and the tail cone 45 are configured to modify a high-volume, low vacuum airflow source into a low-volume, high-vacuum airflow upstream of the primary inlet 20. Advantageously, the first venturi passageway 21, the second venturi passageway 31, and the tail cone 45 are configured to enable the use of smaller hoses 12 and smaller existing dust ported tools on larger existing dust separators and existing cyclone dust collection systems 11. Such a structural configuration yields the new, useful, and unexpected result of improving air flow and suction while increasing ducting velocity.

In a non-limiting exemplary embodiment, the primary inlet 20 has a primary opening 22 centrally circumscribed about the centrally registered longitudinal axis 17. Such a structural configuration yields the new, useful, and unexpected result of improving air flow and suction while increasing ducting velocity.

In a non-limiting exemplary embodiment, the primary opening 22 has an inner diameter **22*a* converging distally towards the second inlet 30**. Such a structural configuration yields the new, useful, and unexpected result of improving air flow and suction while increasing ducting velocity.

In a non-limiting exemplary embodiment, the first venturi passageway 21 begins at the proximal end 19 of the body 15 and terminates at a beginning of the second venturi passageway 31. Such a structural configuration yields the new, useful, and unexpected result of improving air flow and suction while increasing ducting velocity.

In a non-limiting exemplary embodiment, first venturi passageway 21 and the second venturi passageway 31 are coaxially aligned and contiguously disposed at an end-to-end configuration along the centrally registered longitudinal axis 17. The throat 18 is downstream of the first venturi passageway 21 and the second venturi passageway 31. Such a structural configuration yields the new, useful, and unexpected result of improving air flow and suction while increasing ducting velocity.

In a non-limiting exemplary embodiment, an initial diameter **19*a* of a proximal end 19 of the first venturi passageway 21 is greater than an ending diameter 19*b* of a distal end 29 of the first venturi passageway 21**. Such a structural configuration yields the new, useful, and unexpected result of improving air flow and suction while increasing ducting velocity.

In a non-limiting exemplary embodiment, the secondary inlet 30 has a bell-mouth shape and is located downstream of the primary inlet 20. Such a structural configuration yields the new, useful, and unexpected result of improving air flow and suction while increasing ducting velocity.

In a non-limiting exemplary embodiment, a diameter 39*a* of a proximal end 39 of the second venturi passageway 31 is greater than a diameter 38*a* of a distal end 38 of the second venturi passageway 31. Such a structural configuration yields the new, useful, and unexpected result of improving air flow and suction while increasing ducting velocity.

In a non-limiting exemplary embodiment, the diameter 38*a* of the distal end 38 of the second venturi passageway 31 is integral with a proximal end 45*a* of the tail cone 45. Such a structural configuration yields the new, useful, and unexpected result of improving air flow and suction while increasing ducting velocity.

In a non-limiting exemplary embodiment, a diameter 45*b* of the proximal end 45*a* of the tail cone 45 is less than a diameter 40*a* of the outlet 40. Such a structural configuration yields the new, useful, and unexpected result of improving air flow and suction while increasing ducting velocity.

In a non-limiting exemplary embodiment, an entire longitudinal length 51 of the body 15 spans from the primary inlet 20 to the outlet 40. Such a structural configuration yields the new, useful, and unexpected result of improving air flow and suction while increasing ducting velocity.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. A venturi-style vacuum-boosting hose attachment comprising: a single and unitary body having a centrally registered longitudinal axis and including a primary inlet located at a proximal end of said body and having first venturi passageway;

a secondary bell-mouth inlet contiguous with said primary centrally disposed inlet and having a second venturi passageway; and a tail cone contiguous with said secondary inlet and having a third passageway terminating at an outlet located at a distal end of said body;

wherein said secondary inlet is configured to feed smooth air through said tail cone with increased velocity and egress via said outlet;

wherein said first venturi passageway, said second venturi passageway, and said tail cone are configured to modify a high-volume, low-vacuum airflow source into a low-volume, high-vacuum airflow upstream of said primary inlet;

wherein said first venturi passageway, said second venturi passageway, and said tail cone are configured to enable the use of smaller existing hoses and smaller existing dust ported tools on larger existing dust separators and existing cyclone dust collection systems.

2. The venturi-style vacuum-boosting hose attachment of claim 1, wherein said primary inlet has a primary opening centrally circumscribed about the centrally registered longitudinal axis.

3. The venturi-style vacuum-boosting hose attachment of claim 2, wherein said primary opening has an inner diameter converging distally towards said second inlet.

4. The venturi-style vacuum-boosting hose attachment of claim 3, wherein said first venturi passageway begins at said proximal end of said body and terminates at a beginning of said second venturi passageway.

5. The venturi-style vacuum-boosting hose attachment of claim 4, wherein first venturi passageway and said second venturi passageway are coaxially aligned at an end-to-end configuration.

6. The venturi-style vacuum-boosting hose attachment of claim 5, wherein an initial diameter of a proximal end of said first venturi passageway is greater than an ending diameter of a distal end of said first venturi passageway.

7. The venturi-style vacuum-boosting hose attachment of claim 6, wherein said secondary inlet has a bell-mouth shape and is located downstream of said primary inlet.

8. The venturi-style vacuum-boosting hose attachment of claim 7, wherein a diameter of a proximal end of said second venturi passageway is greater than a diameter of a distal end of said second venturi passageway.

9. The venturi-style vacuum-boosting hose attachment of claim 8, wherein said diameter of said distal end of said second venturi passageway is integral with a proximal end of said tail cone.

10. The venturi-style vacuum-boosting hose attachment of claim 9, wherein a diameter of said proximal end of said tail cone is less than a diameter of said outlet.

11. A venturi-style vacuum-boosting hose attachment comprising: a single and unitary body having a centrally registered longitudinal axis and including a primary inlet located at a proximal end of said body and having first venturi passageway;

a secondary bell-mouth inlet contiguous with said primary centrally disposed inlet and having a second venturi passageway; and a tail cone contiguous with said secondary inlet and having a third passageway terminating at an outlet located at a distal end of said body;

wherein said secondary inlet is configured to feed smooth air through said tail cone with increased velocity and egress via said outlet;

wherein said first venturi passageway, said second venturi passageway, and said tail cone are configured to modify a high-volume, low-vacuum airflow source into a low-volume, high-vacuum airflow upstream of said primary inlet;

wherein said first venturi passageway, said second venturi passageway, and said tail cone are configured to enable the use of smaller existing hoses and smaller existing dust ported tools on larger existing dust separators and existing cyclone dust collection systems;

wherein an entire longitudinal length of said body spans from said primary inlet to said outlet.

12. The venturi-style vacuum-boosting hose attachment of claim 11, wherein said primary inlet has a primary opening centrally circumscribed about the centrally registered longitudinal axis.

13. The venturi-style vacuum-boosting hose attachment of claim 12, wherein said primary opening has an inner diameter converging distally towards said second inlet.

14. The venturi-style vacuum-boosting hose attachment of claim 13, wherein said first venturi passageway begins at said proximal end of said body and terminates at a beginning of said second venturi passageway.

15. The venturi-style vacuum-boosting hose attachment of claim 14, wherein first venturi passageway and said second venturi passageway are coaxially aligned at an end-to-end configuration.

16. The venturi-style vacuum-boosting hose attachment of claim 15, wherein an initial diameter of a proximal end of said first venturi passageway is greater than an ending diameter of a distal end of said first venturi passageway.

17. The venturi-style vacuum-boosting hose attachment of claim 16, wherein said secondary inlet has a bell-mouth shape and is located downstream of said primary inlet.

18. The venturi-style vacuum-boosting hose attachment of claim 17, wherein a diameter of a proximal end of said second venturi passageway is greater than a diameter of a distal end of said second venturi passageway.

19. The venturi-style vacuum-boosting hose attachment of claim 18, wherein said diameter of said distal end of said second venturi passageway is integral with a proximal end of said tail cone.

20. The venturi-style vacuum-boosting hose attachment of claim 19, wherein a diameter of said proximal end of said tail cone is less than a diameter of said outlet.

* * * * *